(No Model.)

E. HULETT.
EGG TESTER.

No. 516,630. Patented Mar. 13, 1894.

Witnesses
M. W. Twitchell
May E. Moore

Elvira Hulett,
Inventor
Wm N. Moore
Attorney

THE NATIONAL LITHOGRAPHING COMPANY,
WASHINGTON, D. C.

United States Patent Office.

ELVIRA HULETT, OF PAWLET, VERMONT, ASSIGNOR OF ONE-HALF TO JAMES W. CARVER, OF GRANVILLE, NEW YORK.

EGG-TESTER.

SPECIFICATION forming part of Letters Patent No. 516,630, dated March 13, 1894.

Application filed November 28, 1893. Serial No. 492,224. (No model.)

*To all whom it may concern:*

Be it known that I, ELVIRA HULETT, a citizen of the United States, residing at Pawlet, in the county of Rutland and State of Vermont, have invented certain new and useful Improvements in Egg-Testers, of which the following is a specification, reference being had therein to the accompanying drawings.

My invention relates to improvements in egg testers, and the object of my invention is the provision of a device which can be produced at a very low price by means of which the eggs can be taken from a crate or other receptacle and then tested in a rapid manner thus producing a device which will be practical, useful and economical.

The invention consists of a device for the purposes stated embodying novel features of construction and combination of parts substantially as disclosed herein.

Figure 1:
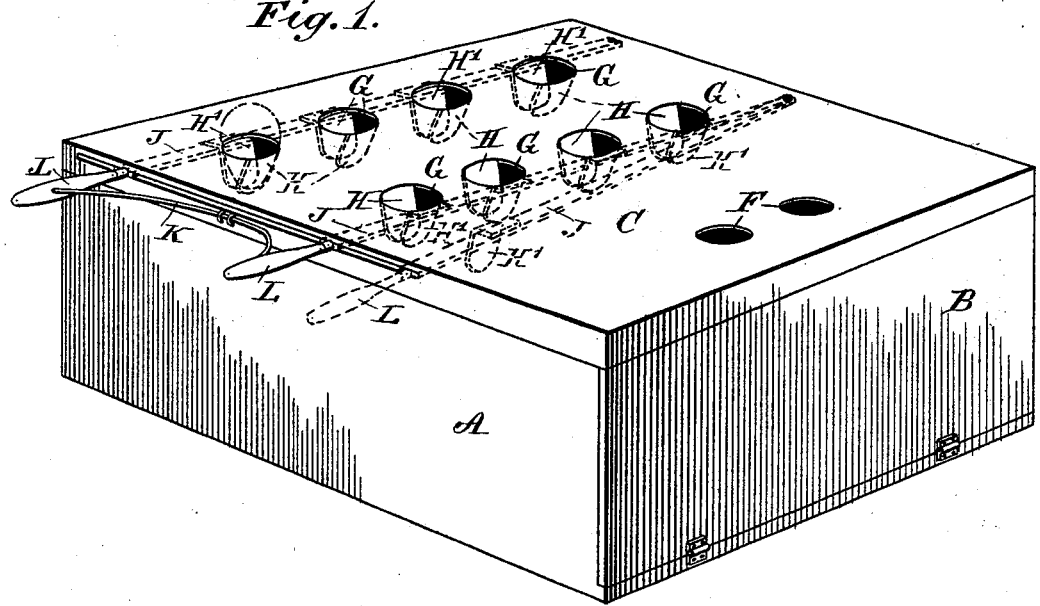
Figure 2:
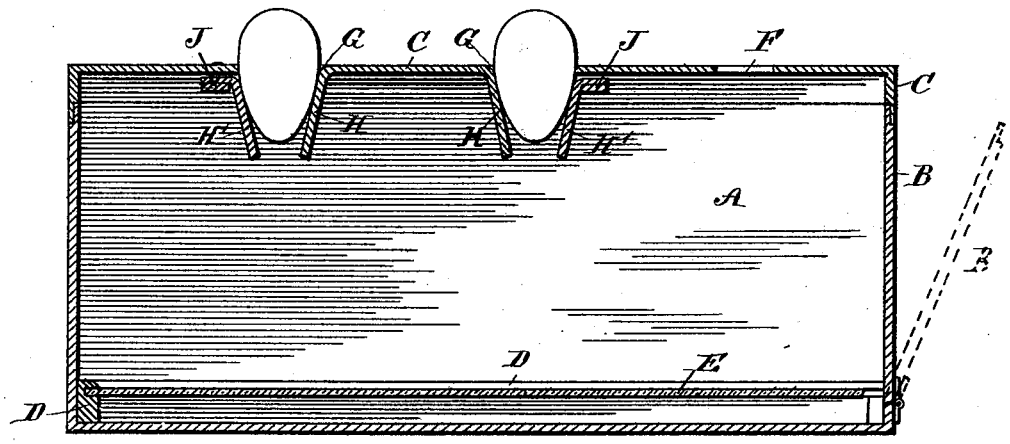

Figure 1 represents a perspective view of my improved egg handling and testing device. Fig. 2 represents a vertical sectional view thereof.

In the drawings—A designates the box or casing of the device, having the hinged end portion B, and the top or cover C. In the lower portion of the box is provided the cleats D, which serve to retain the mirror E. I have the inner faces of the box painted black or dark the purpose of which is to insure an easy testing of the eggs and the cover is provided with the sight openings F, by means of which the reflection of the eggs on the mirror can be easily seen and enable the user to ascertain whether the egg be good or bad. The cover is also provided with the series of egg receiving openings G, and the material on one side of the openings (the inner side) is bent down or turned in to form the curved plates H, which in connection with the similar plates H' on the levers J, which are pivoted at one end to the cover, and have the spring K to retain the levers normally open, form egg lifting plates.

The operation of this device is as follows: The top of the tester is pressed down upon the surface of the eggs contained in the crate, box, or other receptacle, and the handles L being separated permits the eggs, or a number of them, to adjust themselves between the plates H and H'. On pressing the handles together it will be found that each of the plates mentioned will grasp one egg between them and cause it to assume the position shown in Fig. 2.

It will thus be seen that I provide a very simple and inexpensive device by means of which the eggs can be taken up in a large number if desired and tested in a rapid and perfect manner.

I claim—

1. The combination of the casing, the hinged end portion, the cleats therein, the mirror secured by the cleats, the cover having sight and egg receiving openings, and the levers carried by the cover, the rigid plates on the cover and the plates on the levers adapted to grasp the eggs and lift them.

2. The combination of the casing having a mirror therein, a detachable cover on the casing having the sight openings and the egg receiving openings, the curved plates secured or formed on the under face of the cover adjacent to one side of the egg receiving openings, the levers having one end pivoted to the cover and the plates carried by the levers on the opposite sides to the plates of the cover, the plates of the cover and levers serving as egg lifting plates.

In testimony whereof I affix my signature in presence of two witnesses.

ELVIRA HULETT.

Witnesses:
 BYRON A. PRATT,
 JAMES MCBREEN.